Sept. 10, 1929. 1,727,545
A. KORONSKI, NOW BY JUDICIAL CHANGE OF NAME A. KING
LIQUID LEVEL INDICATOR
Filed Sept. 20, 1922
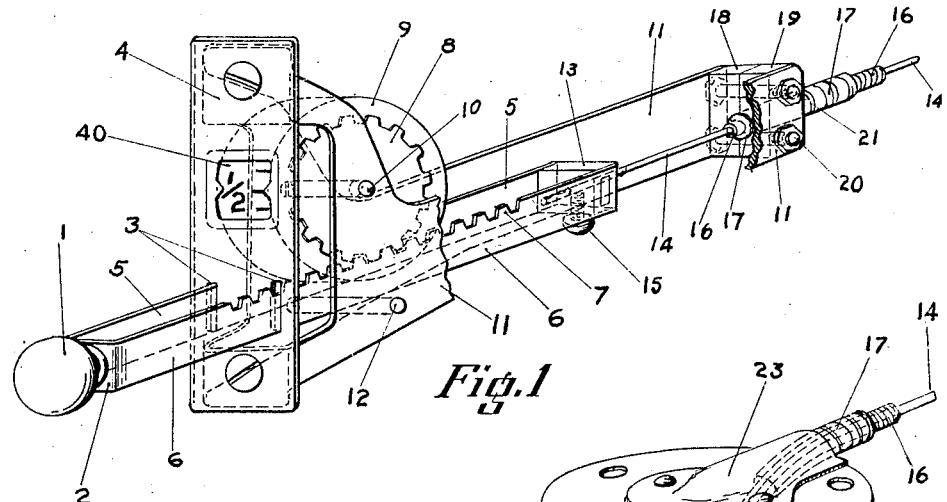
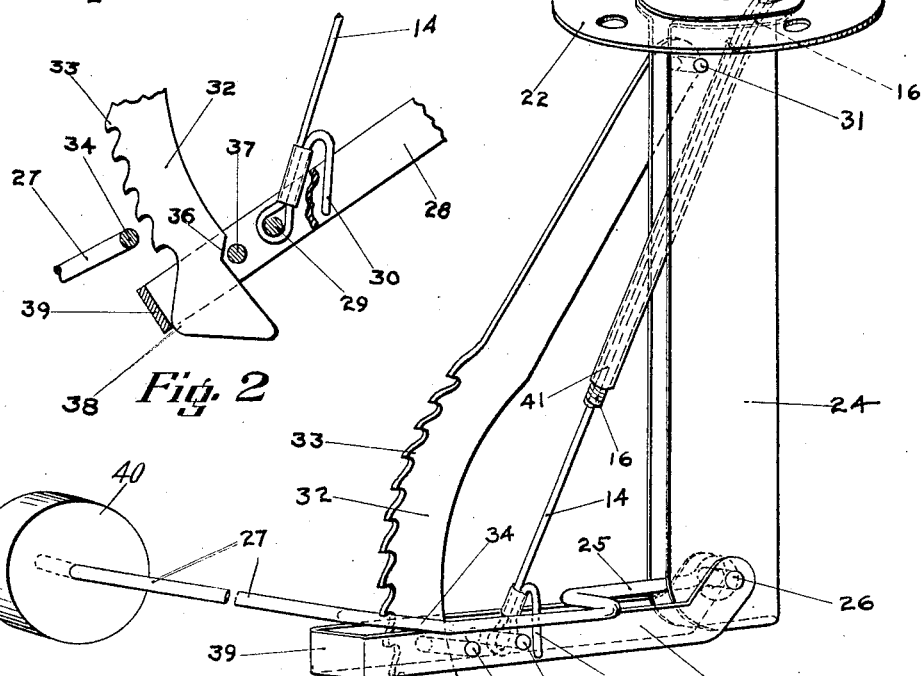
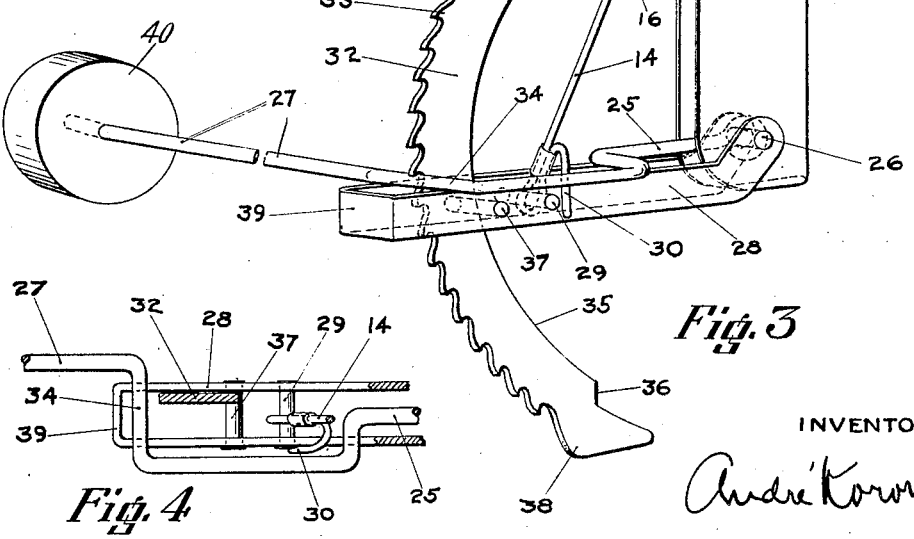
INVENTOR
André Koronski Patented Sept. 10, 1929.

1,727,545

UNITED STATES PATENT OFFICE.

ANDRÉ KORONSKI, NOW BY JUDICIAL CHANGE OF NAME ANDREW KING, OF NARBERTH, PENNSYLVANIA.

LIQUID-LEVEL INDICATOR.

Application filed September 20, 1922. Serial No. 589,287.

My invention relates to that class of gauges which consists of two parts, one of which is located at one point, as in the tank at the rear of an automobile, and forms the gauge proper and the other is located at another place, as on the dash, and comprises the indicator.

The object of my invention is to provide a means for determining the level of a liquid, as gauged by a float, with reference to a fixed point, by a means which is located at a distance from the float and in such a way that the part of the device which indicates the height of the float is entirely free from said float except when taking a reading and a particular object is to provide means which will show the operator of an automobile the amount of gasoline in the tank at the rear of the car while he is sitting in the car, thus obviating the necessity of getting out to look at the tank gauge.

Another object is to provide a means for the purpose stated which shall not get out of order easily and one which will not put a load on the float thus greatly increasing the dependability of the gauge.

Another object is to provide a gauge for the purpose stated in which the wear on the parts shall be a minimum.

I attain these objects by the mechanism illustrated in the accompanying drawings and in which,—

Fig. 1 is an isometric view of the dash board indicator.

Fig. 2 is a section to show the relation of the rack 32, the yoke 28 and the related parts in their normal positions.

Fig. 3 is an isometric view of the part of the gauge located in the tank.

Fig. 4 is a view showing the relation of the float rod 25 and the various parts connected therewith in their normal positions.

In Fig. 1 the knob 1 is attached to the yoke 2 which passes thru the slots 3 in the plate 4, the said yoke 2 being provided with two legs 5 and 6 of which the leg 6 is provided with rack teeth 7 which mesh with the gear 8 which is rigidly attached to the drum 9 which is pivoted on the pin 10 mounted in the frame 11. The pin 12 also mounted in the frame 11 serves to support the yoke 2 and keep the teeth 7 in engagement with the gear 8. Attached to the end of the yoke 2 is the block 13 thru which passes the wire 14 which is fastened to said block 13 by the screw 15.

The wire 14 slips into the control casing 16 which is in turn encased by the flexible tube 17, these forming a housing for the wire 14. Both the control casing 16 and the flexible tube 17 are rigidly attached to the frame 11 by means of the split blocks 18 and 19 and the bolts and nuts 20 and 21, thus securely anchoring the housing of the wire 14 to the frame 11.

The flexible tube 17, the control casing 16 and the wire 14 extend from the indicator on the dash to the gasoline tank (not shown) at the rear and the tube 17 and the control casing 16 are anchored to the tank by means of the cap 22 and the piece 23 to which they are rigidly attaced.

The object of the flexible tube 17 together with the control casing 16 is to provide means for holding the wire 14 so that upon operation of the knob 1 the said wire will move longitudinally in one direction or the other, depending upon the direction of operation of the knob 1, without bending.

Rigidly attached to the cap 22 is the leg 24 which is formed in the general shape shown in Fig. 3 and to which is pivoted the float lever 25 by means of the pin 26. The float lever 25 is bent as shown in Fig. 4 and the end 27 is provided with a float 40. The float lever 25 is free to pivot on the pin 26 and the float itself is entirely free to move up and down according to the level of the gasoline in the tank as the said float lever normally does not operate any mechanism but simply pivots on the pin 26.

Also pivoted on the pin 26 is the yoke or reading lever 28 in which is mounted the pin 29 to which is attached the wire 14. The said wire 14 is secured to the pin 29 by bending and extending the same therearound, as indicated in Fig. 2 of the drawing, and is retained in connected relation with the said wire by a band which incloses the doubled portions of wire in adjacent relation to the said pin. In order to prevent the shifting of the wire 14 along the pin 29 the end portion of the said wire is extended, as indicated at 30, and is bent over the top and along the outside of one leg of the yoke 28. This arrangement and relationship is clearly shown in the drawing.

Pivoted by means of the pin 31 to the leg 24 is the curved lock rack 32 which is provided on one edge with teeth 33 as shown in Fig. 3 and which passes between the legs of the yoke 28 and in the path of the part 34 of the lever 25. The opposite edge 35 of the rack 32 terminates at its lower end in a cam step 36. The pin 37 which is mounted upon and extends transversely of the yoke or reading lever 28 is adapted to ride or move along the edge 35 of the rack 32. The curved rack 32 is also provided with a cam face 38 which is adapted to contact with the inner side of the end 39 of the yoke 28 whereby the outer toothed edge of the said rack is held out of engagement with the portion 34 of the float controlled lever 25 whereby the latter is permitted to move freely up and down to correspond with the varying level of the liquid, such as gasoline, in a tank or container.

As shown in Figs. 1 and 3 of the drawing, the parts are illustrated in the position they assume when reading the gauge for the purpose of ascertaining the level or amount of liquid within a tank or container. In order to ascertain the amount of liquid within a tank the knob 1 is pulled outwardly until it is stopped by the contact of the reading lever 28 with the portion 34 of the float controlled lever 25. It will be understood that the parts will assume different positions depending upon the height or amount of liquid within the tank or container. Normally the knob 1 occupies its extreme inner position in which position the yoke or reading lever 28 occupies its lowermost position, which is its normal position. When in this position the part 39 of the said yoke or reading lever contacts with the face 38 of the rack lever 32 and holds the same inwardly so that the teeth 33 thereon are out of alinement with the transversely extending portion 34 of the float controlled lever 25, so that the latter is free to move up and down about its pivot at 26 to follow the variations in the level of the liquid in the tank or container.

The knob 1 is connected by means of the connection 14 and the yoke 6 with the yoke or reading lever 28. It follows therefore that upon the pulling out of the knob the said reading lever is caused to move upwardly about its pivot. Upon the initial upward movement of the reading lever 28 the rack lever 32 is released and the pin 37 contacts with the cam face or surface 36 so as to move the said rack lever outwardly and cause one of the teeth 33 thereon to engage the transversely extending portion 34 of the float controlled lever 25. The latter is locked in the position which it occupies due to the height or level of the water in the tank or container in connection with which the gauge is employed. Upward movement of the reading lever 28 is limited by its contact with the transversely extending portion 34 of the float controlled lever 25. Obviously outward movement of the knob 1 is limited by the extent to which the lever is moved, since the two are connected by the connection 14. During this time the yoke 2 has rotated the drum 9, which is provided with proper markings which appear in the sight opening 40 in the plate 4 and it will be seen that the amount of the rotation of the drum 9 corresponds to the amount of gasoline in the tank. Normally a blank space appears in the sight opening 40 and during this time the reading apparatus is inoperative and does not interefere with the free motion of the float and float lever.

Any other suitable known means than that above described may be employed for furnishing visual information as to the amounts of liquid which may be contained in the tank or container.

I have also shown the connection between the knob on the dash and the gauge in the tank as made of Bowden control wire and casing but it is evident that any connection such as a wire within a metal tube, etc., or even combinations of rods and levers can also be used.

I have described a gasoline gauge intended primarily for automobiles but I do not want to limit myself to its use in this connection as the gauge has many other uses and can be used whenever the height of any fluid with reference to any point is to be determined from a distance and where it is not necessary or practical to have such reading continuous or where it is better not to have the float operate the indicator directly.

The general advantage of this device lies in the fact that its life is long, that it provides a more convenient method of determining the amount of gasoline in the tank and that it does not give trouble because the means connecting the indicator and the float is used only when a reading is desired and hence does not wear out easily. Since the mechanism is not operated directly by the float all the parts can be made strong and durable.

Another advantage is that there are no springs or weights used in connection with the operation of the wire. The use of springs, etc. in this connection is especially objectionable when used to bring back the wire to its normal position as they are never reliable.

I am aware that gauges have been invented which have one part in the tank and an indicator in the dash or elsewhere and I therefore do not claim such a combination broadly, but I claim:—

1. A gauge for ascertaining the amount of liquid in a container comprising, in combination, a support suitably mounted with reference to said container, means pivoted to said support, which means is adapted to be positioned by a float supported by said liquid; a reading lever pivoted to said support, an indicator, means connecting said indicator and said reading lever, whereby said indicator and said reading lever are caused to move synchronously and means operated upon actuation of said reading lever for locking said float-positioned means in the position it occupies due to the level of the liquid in the container, thereby limiting the movement of said reading lever to a position corresponding to that occupied by the said float positioned means when in locked position to thereby limit the extent of actuation of said indicator.

2. A gauge for ascertaining the amount of liquid in a container comprising, in combination, a support suitably mounted with reference to said container, a remotely located indicator, a lever pivoted to said support, means whereby said lever assumes different positions according to the level of said liquid, means for locking said lever in any position which it may occupy due to the level of the liquid in the container, means cooperating with said locking means for actuating said indicator to a point corresponding to the locked position of said lever to thereby indicate the position of the level of the liquid.

3. A gauge for ascertaining the amount of liquid in a container comprising, in combination, a support suitably mounted with reference to said container, a lever attached to said support, a float attached to said lever to position said lever according to the level of said liquid, an indicator, means for locking said float positioned lever in any position which it may occupy due to the level of the liquid in the container, means cooperating with said locking means for actuating said indicator, said locking means including a member adapted to contact with said float positioned lever upon actuation of said indicator when the latter is in locked position whereby the extent of motion of said actuating means and said indicator is limited by the said float positioned lever when the latter is locked.

4. A gauge for ascertaining the amount of liquid in a container comprising, in combination, a reciprocable member, a member operated by a float the position of which varies with the level of the liquid in the container, means whereby said reciprocable member is normally caused to occupy a position at one limit of its possible movement but whereby it can be caused to move until limited by said float positioned member and means, including said reciprocable member, for locking said float positioned member whereby the extent of the movement of said reciprocable member away from its normal position is limited to an amount depending on the amount of liquid in said container.

5. A liquid level indicator for ascertaining the amount of liquid in a container comprising, in combination, a manually reciprocable member, a lever positioned by a float upon said liquid, and means co-operating with said float positioned lever for limiting the movement of said reciprocable member to an amount corresponding to the amount of liquid in said container, said means including a locking element for said lever, a reading member to which said reciprocable member is connected, and an indicator actuated by the movements of said reciprocable member.

6. A liquid level indicator for ascertaining the amount of liquid in a container comprising, in combination, a support attached to said container, a lever pivoted to said support and adapted to be positioned by a float upon the said liquid, the position of said lever depending upon the level of the liquid within the container, a reading lever pivoted to said support coaxially with said float lever, a toothed locking lever pivoted at another point on said support, means whereby said locking lever is operated by said reading lever to lock the said float positioned lever in any position which it may occupy due to the level of the liquid in said container, an indicator, means for actuating said indicator and for causing movement of said reading lever away from its normal position, and means whereby the movement of said reading lever is arrested by said float positioned lever to determine the amount of actuation of said indicator whereby the latter will indicate the amount of liquid in the container.

7. A liquid level indicator for ascertaining the amount of liquid in a container comprising, in combination, a support located in the liquid, a lever pivotally attached to said support and adapted to be positioned by a float upon the said liquid, reading means for indicating the quantity of liquid present, said reading means including an indicator element and normally being in inoperative position, and locking means for said float positioned lever which locking means is operated by an element of said reading means when the latter is operated, the said float positioned lever being adapted to arrest the operation of said reading means whereby the said indicator is caused to indicate the amount of liquid present.

8. A liquid level indicator for ascertaining the amount of liquid in a container comprising, in combination, an indicator which is adapted to be operated to indicate the amount of liquid present, a reading lever pivoted at a point virtually stationary with reference to said container, means common to the said reading lever and the said indicator for simultaneously actuating both of them, a pivoted lever adapted to be positioned by a float upon the said liquid, means actuated by the said reading lever for locking said float positioned lever in any position occupied by it due to the level of the said liquid, said float positioned lever having a portion in the path of movement of said reading lever with which said reading lever is adapted to contact whereby the extent of movement of said reading lever and of said indicator is controlled by the locked position of said float positioned lever.

9. Apparatus for indicating the liquid level in a receptacle, said apparatus comprising a float normally free to follow variations of liquid level in the receptacle, an indicator, means for operating said indicator and means controlled by said operating means for first positively locking said float at the instant liquid level and for subsequently terminating further movement of the indicator in accordance with the position of the locked float.

10. Apparatus for indicating the liquid level in a receptacle, said apparatus comprising a float normally free to follow variations in liquid level in the receptacle, an indicator remote from the receptacle, means for locking the float in its instant position including an abutment element normally at one end of its travel and capable of moving in a path whose limit in one direction is determined by the position of the locked float, and means for transmitting movement from the indicator to the locking means for locking the float.

11. Apparatus for indicating liquid level in a container, said apparatus comprising a float normally free to follow variations in the liquid level, a member adapted to lock said float in any position, means for operating said locking member including a reading member capable of being arrested by said float when said float is locked and means carried by said reading member whereby said reading member operates said locking member prior to the arresting of the movement of said reading member.

ANDRÉ KORONSKI.